United States Patent [19]

Mayr et al.

[11] Patent Number: 4,726,933

[45] Date of Patent: Feb. 23, 1988

[54] HIGH PRESSURE MIXING HEAD AND REACTIVE COMPONENT INJECTION VALVE

[75] Inventors: Hubert Mayr, Lindau, Fed. Rep. of Germany; Shirley Leidal, Akron, Ohio

[73] Assignee: Admiral Equipment Company, Akron, Ohio

[21] Appl. No.: 785,464

[22] Filed: Oct. 8, 1985

[51] Int. Cl.⁴ ............................................. B01J 14/00
[52] U.S. Cl. .................................. 422/133; 137/883; 137/885; 239/124; 239/125; 422/111; 422/112; 425/4 R; 425/4 C; 521/82; 521/99; 366/137; 366/159; 366/173
[58] Field of Search ............... 422/111, 131, 133, 112; 366/137, 151, 152, 159, 173, 182; 137/883, 885, 165, 625.4, 625.48; 521/82, 99; 425/4 R, 4 C; 239/124, 125

[56] References Cited

U.S. PATENT DOCUMENTS

| | | | |
|---|---|---|---|
| 2,743,137 | 4/1956 | Wilson | 239/125 |
| 3,706,515 | 12/1972 | Keverleber et al. | |
| 4,070,008 | 1/1978 | Schliekmann | |
| 4,082,512 | 4/1978 | Wingard et al. | |
| 4,099,919 | 7/1978 | Leidal | |
| 4,108,606 | 8/1978 | Wingard | |
| 4,115,066 | 9/1978 | Mühle | 422/133 |
| 4,115,299 | 9/1978 | Mühle | 422/133 |
| 4,239,732 | 12/1980 | Schneider | |
| 4,292,947 | 10/1981 | Tanasawa et al. | 239/124 |
| 4,332,335 | 7/1982 | Fiorentini | |
| 4,378,335 | 3/1983 | Boden et al. | |
| 4,389,375 | 6/1983 | Proksa et al. | 366/159 |
| 4,396,151 | 8/1983 | Kato et al. | 239/124 |
| 4,399,105 | 8/1983 | Tilgner et al. | |
| 4,418,041 | 11/1983 | Johnson et al. | 422/133 |
| 4,440,500 | 4/1984 | Schneider | |
| 4,442,070 | 4/1984 | Proksa et al. | |
| 4,452,917 | 6/1984 | Proksa et al. | |
| 4,452,919 | 6/1984 | Schneider | 422/133 |
| 4,464,056 | 8/1984 | Schmitz et al. | |
| 4,474,310 | 10/1984 | Muller et al. | |
| 4,497,579 | 2/1985 | Schmitz et al. | |

OTHER PUBLICATIONS

Krauss Maffei, Krauss Maffei Journal Plastics Machinery, Krauss Maffei; 1982.
Battenfeld, Machinery and Equipment for Processing Urethane, Battenfeld; possibly 1985.
Hennecke, Ti33 PUR Reaction Casting Machine, Type HK, Hennecke.
Schneider Kresta (ed), "Metering and Mixing of Rim Reactants", vol. 18, Polymer Science and Technology, *Reaction Injection Molding and Fast Polymerization Reactions*, Plenum Press, N.Y.; 1982.
Knipp Becker (ed), "Equipment", *Reaction Injection Molding*, Van Nostrand Rheinhold, N.Y.; 1979.
Camargo et al. Kresta (ed), "Experimental Studies of Phase Separation in Reaction Injection Molded (RIM) Polyurethanes" vol. 18, Polymer Science and Technology, *Reaction Injection Molding and Fast Polymerization Reactions*, Plenum Press, N.Y.; 1982.
Schneider Kresta (ed), ACS Symposium Series 270 "New Developments in RIM Equipment" *Reaction Injection Molding Polymer Chemistry and Engineering*, ACS, Washington, D.C.; 1985.
Elonka and Johnson, "Directional Controls", Chap. 8, *Standard Industrial Hydraulics Questions and Answers*, McGraw-Hill, N.Y.; 1967.
Elonka and Johnson, "Pressure Control Valves", Chap. 6, *Standard Industrial Hydraulics Questions and Answers*, McGraw-Hill, N.Y.; 1967.
Bron Aizerman (ed), "Hydraulic Equipment of Automatic Machine-Tool Lines", *Pneumatic and Hydraulic Control Systems*, Pergamon Press, N.Y.; 1968.

*Primary Examiner*—Michael S. Marcus
*Attorney, Agent, or Firm*—Jones, Day, Reavis & Pogue

[57] ABSTRACT

A high pressure mixing head for mixing reactive components in reaction injection molding includes a mixing chamber discharging into a quieting chamber and an injection valve for injecting reactive component into the mixing chamber. Recirculation passages for the reactive component are provided in the mixing chamber and internally of the injection valve. The recirculation passage internally of the injection valve is selectably opened and closed as is the outlet from the injection valve into the mixing chamber. Both the injection valve outlet and the recirculation passage internally of the injection valve are selectably throttleable.

36 Claims, 7 Drawing Figures

HIGH PRESSURE MIXING HEAD AND REACTIVE COMPONENT INJECTION VALVE

BACKGROUND OF THE INVENTION

The invention relates to high pressure mixing heads for at least two reactive components for reaction injection molding or reinforced reaction injection molding processes, whereby such components are mixed and the resulting mixture fed to a mold cavity. More particularly, the invention relates to a high pressure mixing head, having at least one reactive component injection valve of the invention, that mixes a plurality of reactive polymeric components for subsequent injection into a mold.

Reaction injection molding, also called liquid injection molding, is a technique for combining liquid reactive components and injecting them into a mold where they rigidify to form a finished polymeric product. The component combination may be achieved by directing streams of two or more liquid reactive components, each under high pressure, to cause their impingement at a common point in a mixing chamber of a mixing head. The resultant component impact creates a homogeneous mix of material in the mixing chamber, which is then either injected under pressure into a closed mold to which the mixing head is connected, or the mix may simply be dispensed into an open mold. Reinforced reaction injection molding is a variation of that process in which one of the liquid reactive components is mixed with a reinforcing material, such as glass fiber or the like, before being introduced into the mixing chamber.

In the production of urethane products, for example, a diisocyanate or polyisocyanate component is reacted with a diol or a polyol component to produce the reaction mixture by separately feeding these components into a mixing chamber, effecting impingement mixing, and thereafter displacing the intimately-formed mix from the chamber into a mold in which the mix can set. It is also known to include in one or both of the components, or their mixture, an additional foaming or blowing agent capable of expanding the polymerizing resin to form cells or pores therein. Expanding agents suitable for this purpose include those which are normally liquid but volitize at the mold temperature, those which are gaseous and are held under pressure until the material is introduced into the mold, and those which are released by chemical action during the mixing stage and thereafter.

In general, the conditions under which the two components are mixed require that the two components be held separate from one another until the instant at which they enter the mixing chamber, since any premature contact of the two components with one another will result in hardening of the materials. Such premature contact often results in the formation of a mass obstructing further outflow of one or both of the components or the mixture. In order to prevent such obstructions, both components are generally provided in a highly flowable form and are circulated by pumps or the like, being provided to the mixing chamber by various means only when reaction to produce the product mix for molding is desired.

Various structures have been proposed for mixing head devices for mixing the reaction components and feeding the resulting mixture to mold means. Such structures include those illustrated in Keuerleber et al., U.S. Pat No. 3,706,515; Wingard et al., U.S. Pat No 4,082,512; Wingard, U.S. Pat. No. 4,108,606; Leidal, U.S. Pat. No. 4,099,919; Schneider, U.S. Pat. No. 4,239,732; Fiorentini, U.S. Pat. No. 4,332,335; Boden et al., U.S. Pat. No. 4,378,335; Proksa et al., U.S. Pat. No. 4,389,375; Schneider, U.S. Pat. No. 4,440,500; Proksa et al., U.S. Pat. No. 4,442,070; Proksa et al., U.S. Pat. No. 4,452,917; Schneider U.S. Pat. No. 4,452,919; Schmitz et al., U.S. Pat. No. 4,464,056; Schmitz et al., U.S. Pat. No. 4,497,579; Muller et al., U.S. Pat. No. 4,474,310; and Muhle, U.S. Pat. No. 4,115,299. Mixing head structures also include those illustrated in various manufacturer's publications, such as the Krauss Maffei Journal, No. 2/1982, "Polyurethane RIM Technology," pp. 3–4; Hennecke, Brochure Ti 33, "PUR Reaction Casting Machines, type HK," pp. 9–13; and Battenfeld, "Machinery and Equipment for Processing Polyurethane," pp. 12–13.

One form, illustrated in Keuerleber et al., U.S. Pat. No. 3,706,515, includes a body that has an elongated bore which defines a mixing chamber. A plurality of nozzle orifices open into the mixing chamber for conducting reactive polymeric components thereto. The orifices are ordinarily directed at a common point in the mixing chamber to effect impingement of each component with all others to accordingly mix the components together into a homogeneous fluid mass. Flow of all components through all nozzle orifices is simultaneously controlled by a plunger mounted for axially reciprocal movement in the mixing chamber. When the plunger is retracted into its injection position, the orifices in the mixing chamber are opened, permitting reactive components to issue therefrom in the form of high velocity impinging streams. The mixing head also includes a plurality of return passage means, each of which opens into the mixing chamber at a location axially displaced from its respective component nozzle orifice. The plunger is formed with a plurality of axially extending by-pass channels which respectively communicate, when the plunger is in an extended, recirculation position, between the nozzle orifice and return passage means for each component, whereby a closed loop leading back to the component supply is established, providing recirculation for all components simultaneously. Recirculation occurs only via a path external to the nozzle orifices and related valve means. It is not possible to recirculate components individually in the Keuerleber et al. mixing head, nor is it possible to set the recirculation pressure of each recirculating component by means located at the head, individually or otherwise.

Another form of mixing head involves the provision of a second chamber leading to the mold and at substantially right angles to the mixing chamber, this second chamber being provided in turn with a second piston, plunger or ram to drive the mixture out of the chamber. Fiorentini U.S. Pat. No. 4,332,335 discloses a high pressure mixing head in which the additional chamber has the effect of quieting the highly turbulent mixture driven from the mixing chamber into that chamber. The second piston in the quieting chamber serves to clear the channel at the end of each mixing phase and thus prevent the channel from being plugged up by the reacting mixture. The structure of the first chamber and plunger, and the recirculation means of that plunger (axially extending by-pass channels), are substantially identical to that illustrated by Keuerleber et al. Again, recirculation occurs only via a path external to the reactive component injection valves and related apparatus. It is not possible to recirculate components individually, nor is it possible to set the recirculation pressure of each recirculating component by means located at the mixing head, individually or otherwise.

Another form of mixing head involves the provision of means in the reactive component injection valves which allow for recirculation of reactive components internally through the valve when mixing of that component is not ongoing. Schneider U.S. Pat. No. 4,239,732 illustrates a complex reaction injection component valve mechanism utilizing the combination of a solid metering plunger and a reciprocating valve member having an internal passageway with a constricted outlet through which the reactive component must flow. The force of the fluid provided by the acceleration resulting from passage through the restriction impacts on the solid piston when it is in an extended, recirculation position, which stops supply of the component into the mixing chamber and initiates component recirculation. Schneider provides no mechanism in the injection valve for stopping and starting the flow of reactant into the mixing chamber—the injection port is simply blocked by the solid piston (see FIGS. 3-4). No mechanism is provided for selecting the pour pressure or varying the flow into the mixing chamber from said valve. The Schneider valve will not function if the plunger is provided with any type of recirculation or bypass channel, such as disclosed by Keuerleber et al. U.S. Pat. No. 3,706,515, to provide a recirculation path external to the injection valve.

Figure 1:
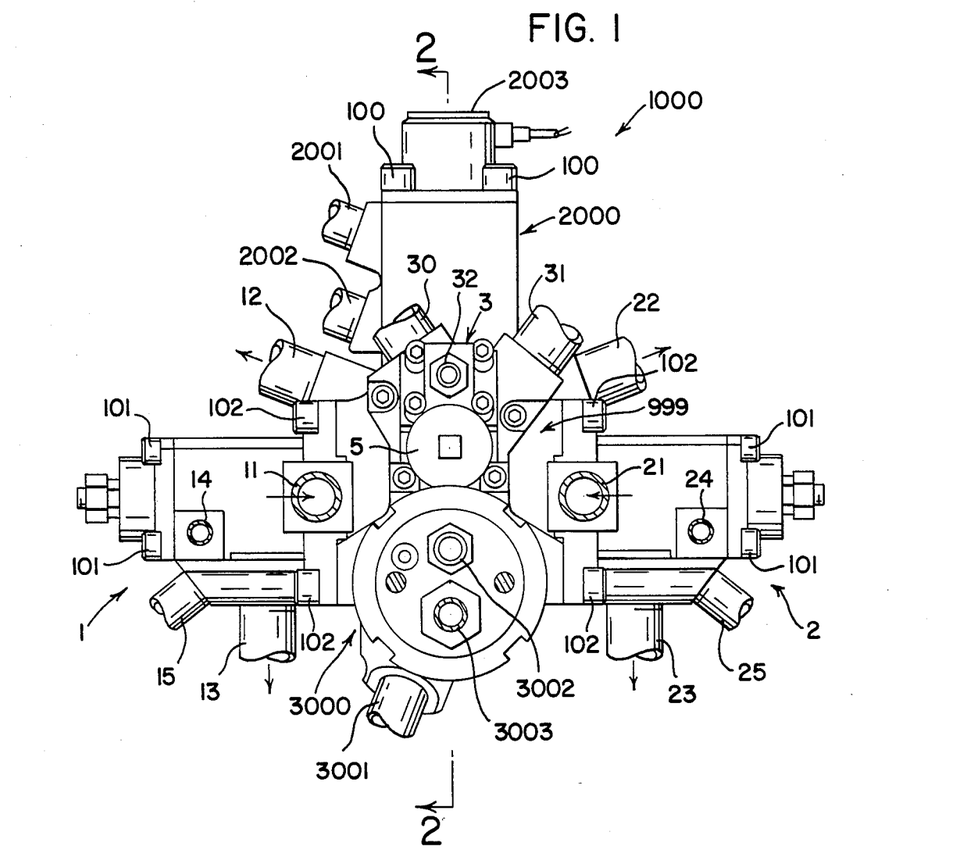
FIG. 1 is a top view of an embodiment of the high pressure mixing head of the invention.

Yet another form of mixing head illustrated in Boden et al. U.S. Pat. No. 4,378,335 involves the provision of external recirculation through axially extending by-pass channels in a metering piston with an injection valve which, although incapable of internal recirculation, does provide means for selecting the pour pressure or varying the flow of reactive component into the reaction chamber (FIG. 1). The valve comprises only one reciprocating member, which opens and closes the valve and controls entry of reactive component to the mixing changer. Not only does Boden et al. fail to provide for internal recirculation in said valve, but it also fails to provide any mechanism in said valve for varying the flow and/or back pressure of the recirculating reactive component.

Figure 2:
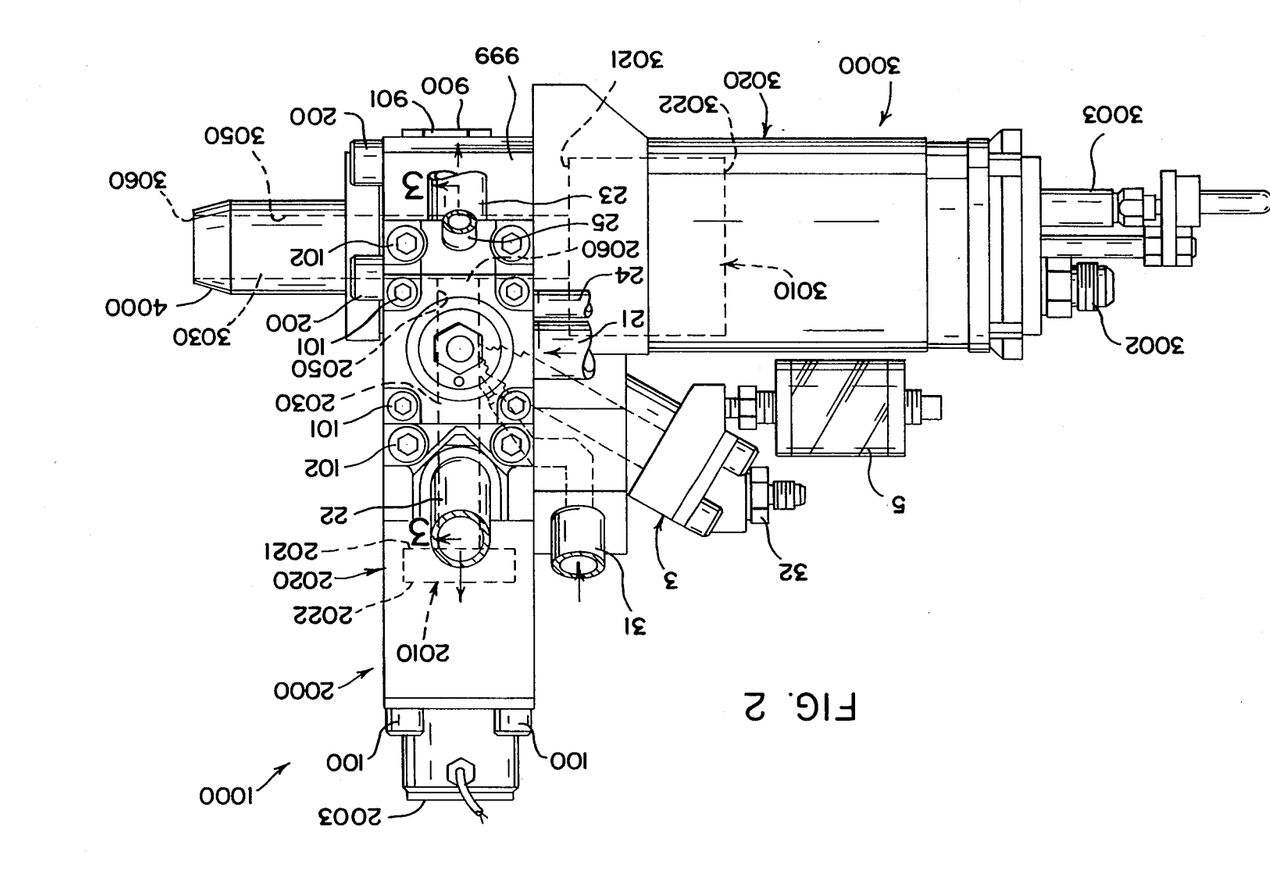
FIG. 2 is a side view of an embodiment of the high pressure mixing head of the invention.

Boden et al. also discloses a second form of mixing head (FIG. 2), which does not provide for recirculation external to the injection valve through the metering piston, incorporating instead a solid piston. Means are provided for selecting at least two pour pressure/flow varying positions of the single reciprocating member, whereby the opening and closing of the valve and entry of reactive component to the mixing chamber is controlled. While allegedly providing for internal recirculation of reactive component through the valve, the actual structure of the valve in FIG. 2 is plainly inoperative for that function. No provision in that valve is made for any mechanism to vary the flow and/or back pressure of the recirculating reactive component.

Each of these mixing heads suffered from a variety of serious shortcomings and problems. Valves affording external recirculation only through axially-extending metering plunger by-pass channels require that all reactive components supplied to the mixing chamber recirculate simultaneously. With those designs, it is impossible to selectively recirculate some, but not all, of the reactive components provided to the mixing chamber. Valves affording only on/off flow of a reactive component to the mixing chamber require the time consuming and expensive replacement of nozzle means or nozzle orifices to effect a change in pour pressure or amount of material provided to the mixing chamber. Valves affording internal recirculation, but neither external recirculation through metering plunger by-pass channels nor adjustment of recirculation back pressure in said valve, make difficult the appropriate setting of recirculation back pressure, and maintenance of the recirculation pressure close to the pour pressure at a point close enough to the mixing chamber to enable virtually instantaneous changeover of reactive component from recirculation to injection modes, as well as losing the ability to provide rapid cycling through external, axially-extending metering plunger by-pass channel recirculation for all components simultaneously where the same reactive components are continuously being provided to said mixing chamber.

With the advent of multiple, particularly dual density or dual firmness urethane products, the shortcomings of the available mixing heads became acute. The preparation of dual firmness articles requires high pressure mixing head apparatus having the capability to mix reactive components interchangeably, thereby forming two different polymeric densities in the molded product.

One mechanism for production of dual density articles involved the use of two separate high pressure mixing heads, one capable of mixing reactive chemicals resulting in polymeric material of a first density, the other capable of mixing different reactive chemicals resulting in material of a second density. Each head had to discharge the formulation into the same mold for production of the final product. The use of two heads had many disadvantages, including substantial expense, the weight of two heads (which makes the use of robotic apparatus to provide formulation to the molds impossible in most instances, because of the limited weight-bearing capacities of available apparatus), the complexities of supply and recirculate hosing and attendant equipment which the use of two heads entailed, and the complexity and expense of system controls which were necessary to coordinate the operation of the two heads.

The manufacture of dual density products requires the ability to change the chemical composition of the formulation almost instantaneously, particularly where robotic apparatus is used to transport the mixing equipment and manipulate that equipment to lay down different formulations in a pattern in the mold. The need to make the changeover in the formulation "on the fly" presented additional problems over those already present in available mixing head apparatus, particularly if a single high pressure mixing head was to supply dual density material.

The rapid change in density of material which would have to be satisfied in one head would require the combination of one reactive species, A, with another, B, at a first time (for example, the impingement mixing of a polyol 1 with isocyanate), while a third reactive species, A*, was recirculating in the system in some manner. The recirculating material would have to be maintained at a recirculation pressure very close to the desired pour pressure for that material, because there would be no time to build up pressure when formulation change was demanded. When the second density formulation was called for, the flow of first reactive species, A, into a mixing area would have to stop instantaneously, that material recirculated in some manner, and the A* reactant switched from recirculation to introduction to that same mixing chamber for impingement mixing with reactant B. At the same time, the formulation would have to be delivered from the head to the mold, and the mixing chamber and any quieting chamber kept clear of formulation to prevent fouling. Because of the combination of rapid formulation composition change and the need to expel formulation from the head while preventing fouling, the demands upon the recirculation capabilities of such a system is beyond that previously provided for.

There is thus a need for mixing head apparatus that would provide dual density reactive component formulation for introduction into molds, useful for reaction injection molding and/or reinforced reaction injection molding processes, that 1. Requires only one mixing head to provide dual density formulations for the production of molded polymeric products;

2. Provides a choice of internal and external (with respect to the reactive component injection means) recirculation paths through the mixing head for each reactive component, to allow rapid changeover between different density formulations, yet provide flexibility and appropriate transport and clearance of mixed reactants from the head;

3. Provides an internal recirculation path independent of an external path using axially extending by-pass channels in a metering plunger for each reactive component, thereby allowing independent injection and recirculation capabilities for each reactive component affected by density changeover, yet able to make virtually instantaneous changeover at the desired pour pressure;

4. Provides for "in the head", independent adjustment and setting of both pour and recirculation pressures for each reactive component, whereby the necessary pressure balances for rapid changeover could be established at a point as close as possible to the impingement mixing location in the mixing chamber, while providing for more rapid system set-up and independent alteration of previously set pressures with convenience and speed; and 5. Operates at high pressure, assuring excellent mixing through impingement techniques.

No available mixing head has combination of these features, particularly failing to provide the choice of recirculation paths, including an internal recirculation path independent of an external path via axially extending bypass channels in a metering plunger, and "in the head" adjustment of both pour and recirculation pressure.

SUMMARY OF THE INVENTION

The invention provides novel high pressure mixing head apparatus for mixing reactive components for reaction injection molding or reinforced reaction injection molding processes, comprising:

A. A mixing head body, having 1. a first bore defining an elongated mixing chamber, said chamber being closed at one end and having an outlet opening at the other end;

2. at least one inlet port to said bore, for introducing a reactive component into said mixing chamber by injection therethrough;

3. at least one outlet passage from said first bore, axially aligned with and spaced from said inlet passage;

4. a second bore defining an elongated quieting chamber, said chamber communicating with, and extending approximately normal to, said mixing chamber at said opening, said quieting chamber having a discharge end remote from said opening;

B. A first, metering plunger closely and slidably received in said first bore, mounted for reciprocal axial movement along the longitudinal axis of the mixing chamber between a retracted, injection position, wherein a mixture of said reactive components is formed in said mixing chamber, and an extended, recirculation position, wherein said plunger is advanced adjacent to said outlet opening to drive said mixture from said chamber, said first, metering plunger having at least one axially extending by-pass channel, which provides fluid communication between said inlet port and said outlet passage when said first, metering plunger is in the recirculation position;

C. A second, clean-out plunger closely and slidably received in said quieting chamber, mounted for reciprocal axial movement along the longitudinal axis of the quieting chamber between a retracted position, wherein said mixture of said reactive components flows into said quieting chamber from said outlet opening in said mixing chamber, and an extended, clean out position wherein said plunger is advanced adjacent to said discharge end to drive said mixture from said quieting chamber;

D. First motive means for reciprocably and selectably moving said first, metering plunger between its recirculation and injection positions;

E. Second motive means for reciprocably and selectably moving said second, clean-out plunger between its retracted and clean-out positions;

F. At least one reaction component injection valve means for injecting a reactive component through said inlet port into said mixing chamber, said injection valve means comprising:

1. a valve body;

2. injection nozzle means disposed in said body;

3. reactive component supply passage means disposed in said body, having intermittent fluid communication with said nozzle means;

4. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;

5. reactive component recirculation passage means disposed in said body, having intermittent fluid communication with said supply passage means;

6. second reciprocating means, disposed within said recirculation passage means in said body, selectably positionable to open, partially open or close said passage means, thereby varying the flow of reactive component through said passage, whereby the recirculation pressure of said component may be set and recirculation effected internally to said valve.

Independent of the novel high pressure mixing head apparatus of the invention, there is provided the novel reaction component injection valve means for injecting a reactive component into a mixing head mixing chamber, said injection valve means comprising:

1. a valve body;

2. injection nozzle means disposed in said body;

3. reactive component supply passage means disposed in said body, having intermittent fluid communication with said nozzle means;

4. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;

5. reactive component recirculation passage means disposed in said body, having intermittent fluid communication with said supply passage means;

6. second reciprocating means, disposed within said recirculation passage means in said body, selectably positionable to open, partially open or close said passage means, thereby varying the flow of reactive component through said passage, whereby the recirculation pressure of said component may be set and recirculation effected internally to said valve.

The novel high pressure mixing head and reaction component injection valve of the invention provide for the preparation of dual density polymeric products through a single, high pressure head heretofore unavailable. The invention solves one or more of the needs which available mixing head designs were unable to provide, including providing high pressure impingement mixing for forming dual density product formulations in a mixing head having means for two different, independent recirculation paths: those internal to the reactive component injection valve(s), and those external to said valves; enabling the independent injection and recirculation of each reactive component whose introduction must be varied to change the chemical makeup of the formulations and thereby the density of the molded product; and providing for "in the head", independent adjustment and setting of both pour and recirculation pressures for each reactive component, whereby the necessary pressure balances for rapid changeover could be established at a point as close as possible to the impingement mixing location in the mixing chamber, while providing for more rapid system set up and independent alteration of previously set pressures with convenience and speed.

The novel reaction component injection valve of the invention itself provides capabilities heretofore unavailable, including a recirculation path internal to the valve; means selectably positionable to open, partially open or close nozzle means in said valve, whereby the flow of reactive component and its pour pressure through said nozzle may be set; and means selectably positionable to open, partially open or close said internal recirculation path, whereby the recirculation flow of reactive component and recirculation pressure through that path may be set.

It is therefore an object of this invention to provide a high pressure mixing head for the impingement mixing of reactive components for reaction injection molding or reinforced reaction injection molding processes to provide multiple density formulations for the production of molded polymeric products.

It is another object of this invention to provide a single high pressure mixing head having two recirculation paths for each reactive component which may be chosen as necessary, one of said paths, being independent of the use of axially extending bypass channels in a metering plunger, being internal to the injection valve, thereby providing independent injection and recirculation capabilities for each reactive component affected by density changeover, while affording virtually instantaneous changeover at the desired pour pressure.

It is a further object of this invention to provide a single high pressure mixing head having means for "in the head", independent adjustment and setting of both pour and recirculation pressures for each reactive component, whereby the necessary pressure balances for rapid changeover may be established at a point as close as possible to the impingement mixing location in the mixing chamber.

It is yet another object of this invention to provide a novel reactive component injection valve having a recirculation path internal to itself; means to open, partially open or close nozzle means therein, whereby the flow of reactive component and its pour pressure through said nozzle may be set; and means selectably positionable to open, partially open or close said internal recirculation path, whereby the recirculation flow of reactive component and recirculation pressure through that path may be set.

Other objects and advantages of this invention will become apparent upon reading the following detailed description and appended claims.

DESCRIPTION OF THE PREFERRED EMBODIMENT

A preferred embodiment of the high pressure mixing head of the invention is more fully illustrated in FIGS. 1-7 hereto, and may best be understood by reference to the drawing.

The high pressure mixing head 1000 is shown generally in FIG. 1. In its major components, the mixing head has a mixing head body 999, and a metering plunger assembly 2000 affixed thereto, which comprises a first metering plunger, a mixing chamber defined in combination with said body and a hydraulic, dual acting cylinder for imparting retracting and extending reciprocal axial movement to said plunger with respect to the longitudinal axis of the mixing chamber. Hydraulic conduits 2001, 2002 are supply and return conduits for a fluid material, which lines are further connected to supply, pressurizing and control means of the type well known in the art. A clean-out plunger assembly 3000 is also affixed to body 999, which assembly comprises a second, clean-out plunger, a quieting chamber defined in combination with said body and a hydraulic, dual acting cylinder for imparting retracting and extending reciprocal axial movement to said plunger with respect to the longitudinal axis of the quieting chamber. That assembly 3000 is disposed so that its longitudinal axis is substantially at a right angle to that of the metering assembly 2000. The configuration of the metering assembly 2000 and the clean-out assembly 3000 forms an "L" structure, and the mixing head may be referred to as an "L" mixing head. Hydraulic conduits 3001, 3002 are supply and return conduits for a fluid material, which lines are further connected to supply, pressurizing and control means of the type well known in the art.

Each plunger assembly bears position sensing means at its distal end. Means 2003 on metering assembly 2000 senses when the metering plunger is in its maximum position of retraction. Means 3003 on clean-out assembly 3000 senses when the clean out plunger is in its maximum position of retraction. These positioning means act in cooperation with the supply, pressurizing and control means for each of said assemblies, to enable the sequential retraction and extension of each of the metering and clean-out plungers during the operation of the mixing head, as explained more fully hereafter.

The preferred embodiment is configured to provide for the injection of three reactive chemicals to the mixing chamber in metering assembly 2000. These chemicals may preferably comprise an isocyanate, a first polyol component and a second polyol component. (Additional foaming or blowing agent, if required, may be introduced into the supply line for any of these components, preferably a polyol, upstream of the mixing head.) A reactive component mix formed from the impingement mixing of the isocyanate with the first polyol component provides a liquid froth which, when molding is complete, is converted to a urethane product having a first density X. A reactive component mix formed from the impingement mixing of the isocyanate with the second polyol component provides a liquid froth which, when molding is complete, is converted to a urethane product having a second density, Y, which may be greater or less than first product density X.

While two reactive component injection valves of the invention, valves 1 and 2, arrayed so as to extend in substantlally the same plane, normal to the axis of the clean-out assembly 3000 and substantially parallel to the axis of the metering assembly 2000, and an isocyanate injection valve 3, arrayed at an acute angle to the axis of the clean out assembly 3000, comprise the preferred embodiment, additional reactive component rejection valves of the invention may be disposed radially about the mixing chamber. The number of reactive component injection valves of the invention that may be used ls limited only by the physical constraints of the diameter of the mixing chamber and the size of mixing head body 999. Four polyol reactive component injection valves, for example, may be radially arranged so as to extend in substantlally the same plane normal to the longitudinal axis of the metering assembly 2000 (and in a plane substantially parallel to the longitudinal axis of the clean out assembly 3000), with the isocyanate injection valve arranged above that plane, at an acute angle thereto. In that manner, the injected components streams from all five injectors may be aligned so as to impinge at substantially the same point in the mixing chamber.

Isocyanate injection valve 3 (FIGS. 1 and 2), as illustrated, is an injector of the type known to the art. The novel reaction component injection valve of the invention, however, may be used to supply isocyanate to the mixing chamber. Isocyanate is supplied to injector 3 by isocyanate supply conduit 31, and is returned to the isocyanate source through conduit 30. Metering pumps, storage tanks, heating means and related apparatus (not shown) make up the remainder of such isocyanate supply system, all as is well known to those skilled in the art.

Reaction injection component valve 1, which provides a first polyol reactive component to the mixing chamber disposed in body 999 and assembly 2000, is provided with supply conduit 11 and two return conduits, 12 and 13. Conduit 12 returns recirculating polyol to the polyol source, when that recirculation is effected through a path external to the valve. Conduit 13 returns recirculating polyol to the polyol source, when that recirculation is effected through a path internal to the valve. Metering pumps, storage tanks, heating means and related apparatus (not shown) make up the remainder of such first pclyol supply system, all as is well known to those skilled in the art.

Reaction injection component valve 2, which provides a second polyol reactive component to the mixing chamber disposed in body 999 and assembly 2000, is provided with supply conduit 21 and two return conduits, 22 and 23. Conduit 22 returns recirculating polyol to the polyol source, when that recirculation is effected through a path external to the valve. Conduit 23 returns recirculating polyol to the polyol source, when that recirculation is effected through a path internal to the valve. Metering pumps, storage tanks, heating means and related apparatus (not shown) make up the remainder of such second polyol supply system, all as is well known to those skilled in the art.

Assembly of the mixing head is provided by the use of threaded through bolts, which are received in tapped receiving bores in the body 999, in the case of the metering assembly 2000 (bolts 100). Clean out assembly 3000 is fastened to body 999 by the use of threaded through bolts 200 (FIG. 2), which are received in tapped receiving bores in said assembly. Each of the reaction component injection valves for each polyol component are mounted to a mounting and reactive component chamber means 601 by threaded through bolts 101, which are received in tapped receiving bores in said means 601. Means 601 is in turn fastened to body 999 by bolts 102, which are received in tapped receiving bores in the said body.

Hydraulic conduits 14, 15 in valve 1 are supply and return conduits for a fluid material, which lines are further connected to supply, pressurizing and control means (not shown) of the type well known in the art, whereby the first and second reciprocating means in the first polyol valve (hereafter described) are actuated. Hydraulic conduits 24, 25 in valve 2 are supply and return conduits for a fluid material, which lines are further connected to supply, pressurizing and control means (not shown) of the type well known in the art, whereby the first and second reciprocating means in the second polyol valve (hereafter described) are actuated. Hydraulic conduit 32 is a supply conduit for a fluid material, which line is further connected, along with another return conduit not shown in FIGS. 1 or 2, to supply, pressurizing and control means (not shown) of the type well known in the art, whereby the isocyanate injection means is actuated.

The positional relationship between the mixing head body 999, the metering assembly 2000 and the clean-out assembly 3000, and the components comprised by each, is illustrated in FIG. 2. Metering assembly 2000 comprises a first, metering plunger 2010, which is in turn made up of double acting cylinder means 2020 and the elongated, axially extended plunger body 2030. Plunger body 2030 is closely and slidably received in first bore 2050, which defines in part an elongated mixing chamber, closed at the end proximal to position sensor 2003 by the end of plunger 2030 when fully retracted and open at an outlet opening 2060. By regulation of the fluid supply to double acting piston 2020, so that fluid pressure is applied to face 2021 of that piston (through conduit 2002), plunger body 2030 may be retracted in an upwardly direction with respect to outlet opening 2060, so that its end distal from piston 2020 leaves said opening 2060 unobstructed, while similarly leaving unobstructed inlet ports 500 disposed in the peripheral wall of first bore 2050. That portion of bore 2050 unoccupied by plunger body 2030 when the piston 2020 is in its uppermost, retracted injection position, comprises the mixing chamber of the mixing head.

Figure 3:
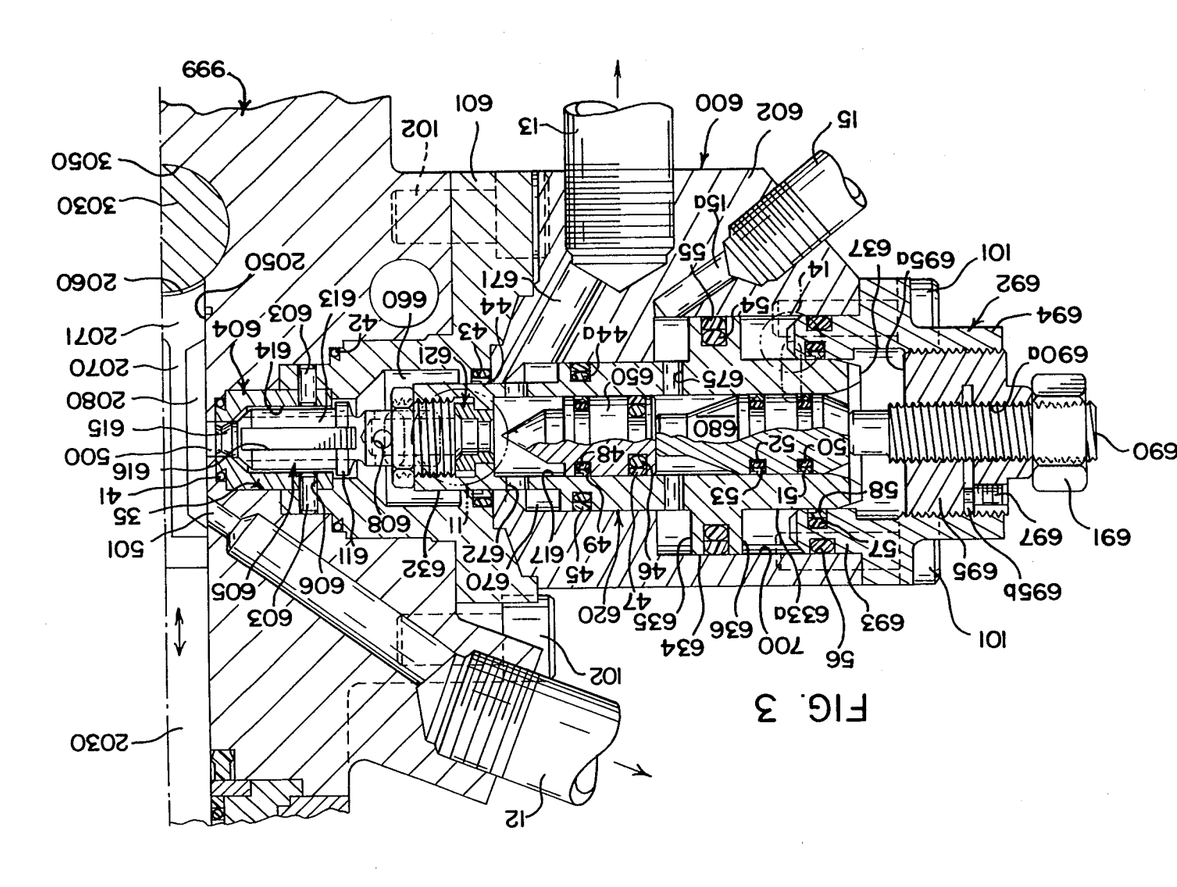
FIG. 3 is a sectional view of the reactive component injection valve of the high pressure mixing head of the invention, taken along line 3—3 in FIG. 2.

By applying fluid pressure to face 2022 of the double acting piston 2020 (through conduit 2001), plunger body 2030 is displaced from its retracted, injection position to its extended, recirculation position, as illustrated in FIGS. 2 and 3. In displacing the plunger body 2030 towards outlet opening 2060, the end of the plunger serves to drive out all reactive chemical formulation present in the mixing chamber, thereby cleaning out materials which would otherwise harden and block the injection ports and mixing chamber.

The movement of plunger body 2030 brings each of axially extending by-pass channels 2080 into alignment with an injection port 500 and an outlet passage 501 from the bore 2050 (FIG. 3). Port 500 and the entrance to passage 501 are coaxial, said entrance being spaced axially in the peripheral wall of the bore with respect to the bore centerline therefrom. Although illustrated in FIG. 3 as being vertically above port 500, the entrance to passage 501 is located at a position below the port 500 as well.

Axially extending by-pass channels 2080 are provided to correspond to each aligned pair of an inlet port 500 and outlet passage 501, through which combination fluid communication is established between each inlet port 500 and outlet passage 501 entering and leaving the mixing chamber. There is one axially extending by-pass channel 2080 formed in plunger body 2030 for each port, all having the same axial extent and each separated from the other by elongated finger lands 2070. Because of the spatial arrangement between the reactive component injection valves and the by-pass channels, all channels 2080 align with all ports 500 and outlet passages 501 simultaneously. Recirculation of reactive component from port 500 through passage 2080 into passage 501 and out of the mixing head body 999 results, if reactive component continues to be injected through port 500. The extended, recirculation position of the plunger body 2030 provides the port 500 to passage 2080 to outlet passage 501 pathway by means entirely external to the reactive component injection valves 1 and/or 2.

The plunger body 2030 to bore 2050 fit is, by necessity, as close as can be attained by ordinary machining techniques, to prevent leakage of the high pressure reactive component streams as they are injected into the mixing chamber, and as they recirculate through the external path provided by axially extending by-pass passages 2080 and outlet passages 501.

Binding and/or seizing of the plunger body 2030 in the bore 2050 is prevented by sheathing substantially all of the plunger surface in a sleeve of an antifriction material. The plunger is formed to prevent this sleeve from flowing or otherwise being squeezed into the by-pass passages 2080 by machining the plunger wall surrounding the by-pass passages 2080 to form depressed regions for receiving the antifriction sleeve, yet leaving peripherally continuous metal lands 2071 surrounding the respective channels to provide the necessary structural restraint for the sleeve.

The outer surface of the plunger body 2030 is formed with a recess that completely encompasses the plunger intermediate its length and extends axially downwardly to form elongated finger lands 2070 that lie between and are axially coextensive with the by-pass passages 2080. The recess is milled in the plunger body 2030 so as to leave lands 2070 which peripherally enclose channels 2080 and meld into a circumferential land 2071 at the free end of the plunger. A sleeve of antifriction material is suitably secured in this recess, as by cementing, so as to provide a major portion of the plunger body 2030 bearing surface, yet be supported laterally of the recess by the lands 2070, 2071 which prevent extrusion or flow under pressure into the by-pass passages 2080 or endwise of the free end of the plunger.

The polymeric-base material sleeve defines a plunger body diameter slightly larger than the diameter of said bore 2050 prior to insertion therein, but is compressed by insertion into said bore 2050 to form a close sliding seal therewith. The nature of the anti-friction material is of some criticality. It has been found that a material sold under the trademark "RULON" by Dixon Corporation, Bristol, R.I., is well suited for this purpose. Such material is described in U.S. Pat. Nos. Re. 26,088 and 3,652,409 assigned to that company. In general, it is a composite consisting of a homogeneous mixture of three components comprising (a) polytetrafluoroethylene (PTFE); (b) a silicate such as glass, talc, mica or aluminum silicate; and (c) a metallic particulate of a metal such as molybdenum, copper, lead or silver. Additional information on several forms of the product is given in a Dixon Corporation catalog entitled "Design Engineering Manual 101." Another material useful as a possible equivalent comprises a homopolymer of p-oxybenzoyl repeat units, sold under the trade name "Ekanol" by the Carborundum Company, Niagara Falls, N.Y., in combination with PTFE (polytetrafluoroethylene) polymer and glass fiber.

Clean-out assembly 3000 is arrayed at substantially a right angle to metering assembly 2000, as shown in FIG. 2. Clean-out assembly 3000 comprises a second, clean-out plunger 3010, which is in turn made up of double acting cylinder means 3020 and the elongated, axially extended solid plunger body 3030. Plunger body 3030 is closely and slidably received in second bore 3050, which defines in part an elongated quieting chamber, closed at the end proximal to position sensor 3003 by the end of plunger body 3030 when fully retracted, and open at an outlet opening 3060, which constitutes a longitudinal bore in output nozzle means 4000. Nozzle means 4000 comprises the exit means from the mixing head of the reactive chemical formulation, which is in liquid froth form at that point. Nozzle means 4000, in operation of the head to produce molded polymeric articles, is positioned over mold means and liquid froth provided to those means therefrom. The mold means is then closed and heated, causing the chemical reaction to take place and producing the resulting polymeric product.

By regulation of the fluid supply to double acting piston 3020, so that fluid pressure is applied to face 3021 of that piston (through conduit 3001), plunger body 3030 may be retracted in an inwardly direction with respect to nozzle means 4000, away from outlet opening 2060, so that its end distal from piston 3020 leaves said opening 2060 unobstructed. That portion of bore 3050 unoccupied by plunger body 3030 when the piston 3020 is in its innermost, retracted position, comprises the quieting chamber of the mixing head. Liquid reactive component formulation resulting from high pressure impingement mixing of components in the mixing chamber defined by plunger body 3030 and bore 3050 flows through outlet opening 3060 and into the side wall of bore 3050. The impact of that stream with the wall, and the right angle taken by the flow path from bore 2050 to bore 3050 and outlet 3060 acts to convert turbulent liquid mix flow into substantially laminar flow. Liquid reaction formulation is as a result dischargeable through nozzle means 4000 into a mold without splashing of the material.

By applying fluid pressure to face 3022 of the double acting piston 3020 (through conduit 3002), plunger body 3030 is displaced from its retracted position to its extended, clean-out position, as illustrated in FIGS. 2 and 3. In displacing the plunger body 3030 outwardly towards opening 3060, the end of the plunger serves to drive out all reactive component formulation present in the quieting chamber, thereby cleaning out materials which would otherwise harden and block the quieting chamber and mixing head exit means.

The sequence of movements of plungers 2010 and 3010 during a mixing cycle begins with both plungers in their fully retracted positions. Reactive components are injected into the mixing chamber in bore 2050, where they mix by high pressure impingement mixing and form a liquid froth. Outlet opening 2060, being unblocked by plunger body 3030, allows that liquid froth to pass from the mixing chamber into the quieting chamber in bore 3050. Movement of plunger body 2030 is initiated by applying fluid pressure to face 2022 of piston 2020, which drives the plunger down the length of the mixing chamber towards outlet opening 2060. The liquid formulation is all forced through outlet opening 2060 into the quieting chamber. Axially extending by-pass channels 2080 simultaneously align with all injection ports 500, providing fluid communication to one each of aligned passages 501 for each injection port. Reactive components injected through the ports are thereby recirculated through paths external to their respective injection valves. As plunger body 2030 reaches the maximum degree of its extending travel, movement of plunger body 3030 is initiated by applying fluid pressure to face 3022 of piston 3020, which drives the plunger down the length of the quieting chamber towards outlet 3060. The remaining liquid formulation is all forced through outlet 3060 and nozzle means 4000 to the environment proximate to the nozzle. In a normal use environment, formulation would be supplied to molding means. Plunger body 3030 is then returned to its fully retracted position by the application of fluid pressure to face 3021 of piston 3020. Plunger body 2030 is thereafter returned to its fully retracted position by the application of fluid pressure to face 2021 of piston 2020. Position sensor 3003 senses when the piston 3020 reaches maximum retraction, while position sensor 2003 senses when the piston 2020 reaches maximum retraction, which information is used by the control means to perform the cycle described. The withdrawal of plunger body 2030 breaks the external recirculation path between ports 500, channels 2080 and outlet passages 501, leading to the reinstitution of injection into the mixing chamber.

No variation of the recirculation pressure experienced by reactive component externally recirculating between ports 500, channels 2060 and outlet passages 501 is possible in the mixing head of the invention. The geometry of the path will, however, provide a certain inherent back pressure when recirculating through this path. Recirculation pressure adjustment in those paths can be effected if appropriate valving or other restricting means, downstream of passages 501, are installed in the return lines upstream of the necessary reactive component pumps and storage tanks.

The preferred embodiment of the mixing head of the invention provides additional means 5, in the form of a liquid reservoir, for introduction of components into the mixing chamber. Di-octyl phthalate, for example, may be provided to the liquid mix through reservoir means 5.

An additional location for introduction of a reactive component is provided at port 900, located opposite outlet 2060 at the junction of bores 2050 and 3050, and covered by plug 901. Injector means of the type known in the art may be disposed in port 900, or novel reactive component injection means of the invention may instead be disposed there. Any of the known reactive components may be supplied at port 900 to the still-forming formulation, including a polyol, colorant material, colorant borne in a polyol, and/or other additive material.

The reaction component injection valve means of the preferred embodiment of the invention are best illustrated in FIGS. 3–7. Valves 1 and 2 are identical in structure, though opposite in orientation in relation to bore 2050. The description of the function of valve 1 is applicable to valve 2 as well.

Reactive component injection valve body 600 is comprised of two submembers: mounting and reactive component chamber means 601, and reciprocating body means 602, which are disposed so as to abut one another by through bolts 101, 102 previously described. While it is contemplated that a one piece valve body 600 may be utilized, the two submember construction affords easier machining requirements, greater precision and the ability to effect rapid removal and replacement of the injection valve in the mixing head.

Figures 6, 7:
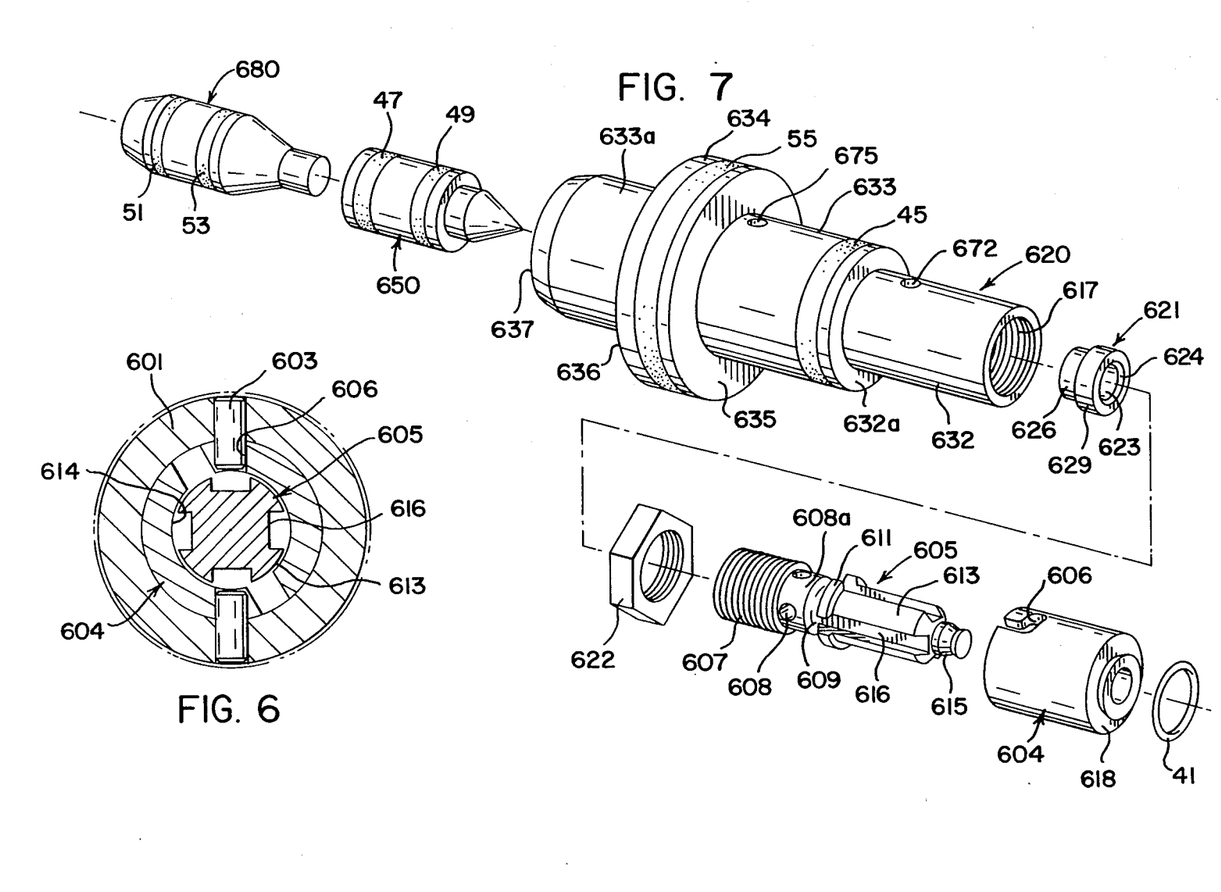
FIG. 6 is a sectional detail view of the reactive component injection valve, taken along line 6—6 in FIG. 4.
FIG. 7 is an exploded view of internal means of the reactive component injection valve illustrated in FIGS. 3-5.

Injection nozzle means comprised of injection orifice 604 and injection head 605 are nestingly disposed, one to the other, in the central axial bore 35 of body 600. Injection orifice 604 is secured in mounting and reactive component chamber means 601 by bayonet mounting pins 603, disposed in body 601 so as to project radially inwardly towards said bore 35, which pins fit in receiving means 606 in injection orifice 604 (FIG. 7). When valve body 600 is secured to mixing head body 999, the orifice 604 aligns with port 500 and may not be removed. The removal of bolts 102, however, releases the valve from mixing head body 999; the valve may readily and quickly be withdrawn, the injection orifice 604 removed by rotation about its longitudinal axis to release means 606 from the bayonet pins 603, and a new orifice put in its place and secured by reversing the sequence.

Injection head 605 is provided with an external threaded portion 607, which threadingly engages the internally threaded, forward portion of bore 617 in first reciprocating means 620. Ports 608 extend radially inwardly from a necked-down portion 608a of injection head 605 into internal bore 610 (FIGS. 4, 5), which extends rearwardly and inwardly towards reciprocating means 620. A further necked-down section 609 of injection head 605 extends forwardly from portion 608a. A shoulder portion 611 having a diameter greater than the necked-down portions 608a and 609, and approximately equal to the body diameter of threaded portion 607, extends forwardly from portion 609 of head 605. The diameter of the shoulder is set such that it exceeds the diameter of bore 614 through the interior of injection orifice 604, whereby that shoulder is capable of contact with the rearward face 612 of injection orifice 604 and thereby acting as a secondary stop to arrest forward travel of the injection head 605 into the injection orifice 604.

A plurality of radially projecting fin members 613 extend from shoulder 611 towards the tip 615 of injection head 605. Fin members 613 are separated by slots 616, the combination of fins and slots serving to break up and disperse the reactive component liquid flow as it passes over injection head 605, to result in a spray of component being injected through injection orifice 604 and port 500 into the mixing chamber. While fin members 613 are illustrated as axially extending in parallel, one to the other, a helical or other convolute pattern may also be used, whereby greater break-up of the high pressure liquid stream can be effected. Tip 615 of injection head 605 is substantially frustoconical in shape, and is machined to provide a seating fit with the complementary forwardmost portion 619 of bore 614 in orifice 604. The fit of tip 615 to interior portion 619 of said bore must be sufficiently tight to prevent any unwanted flow of reactive component through injection orifice 604 and port 500 when said valve is closed.

An O ring 41 is provided to seal the contact of front face 618 of injection orifice 604 with the mixing head body 999. A second O ring 42 is provided for the same purpose where body member 601 also fittingly contacts mixing head body 999 (FIG. 3).

Figure 4:
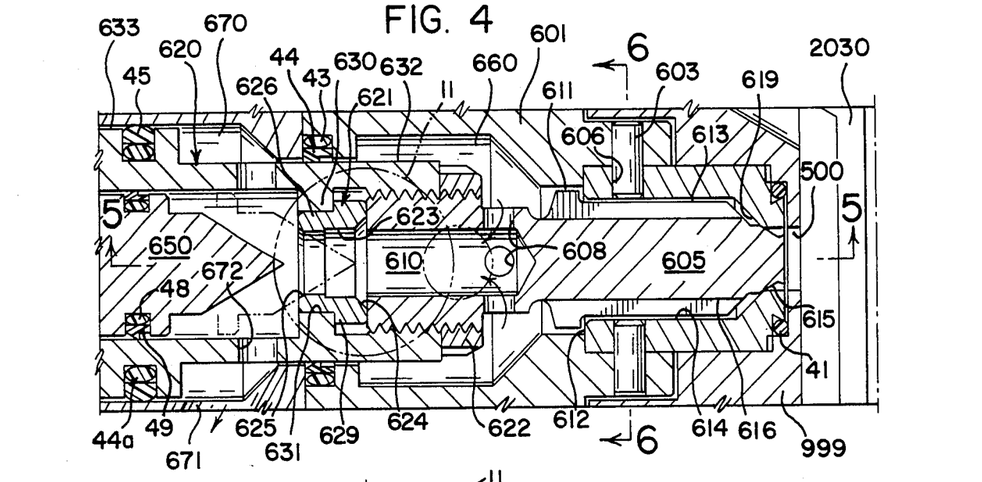
FIG. 4 is a detail view of the reactive component injection valve illustrated in FIG. 3.
Figure 5:
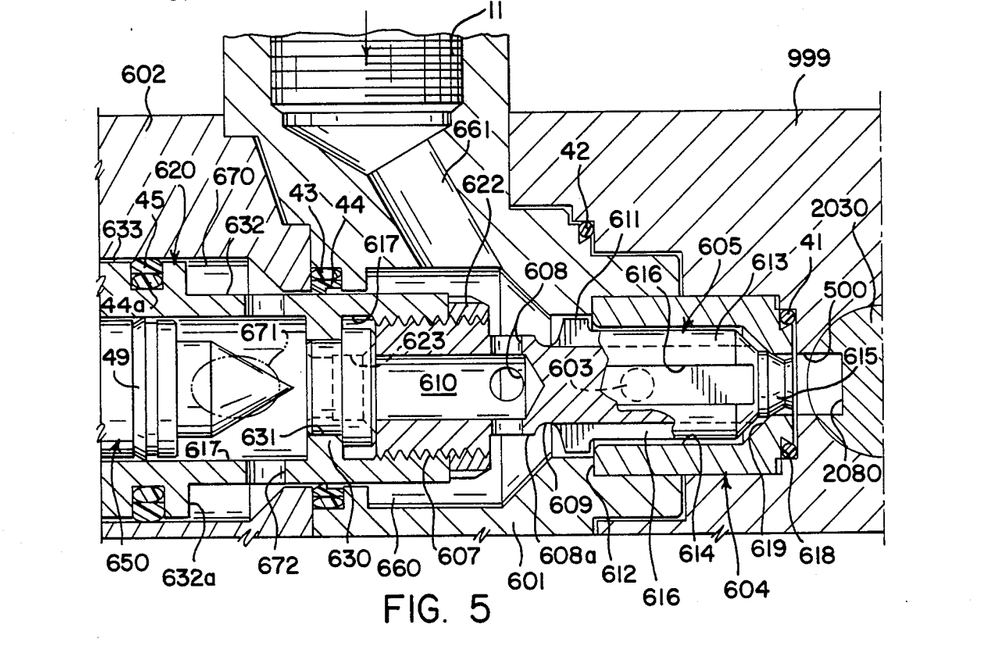
FIG. 5 is a sectional detail view of the reactive component injection valve, taken along line 5—5 in FIG. 4.

Injection head 605, as noted, is threadingly engaged with a threaded, forward portion of bore 617, which bore extends through the axial or longitudinal extent of first reciprocating means 620. The diameter of said threaded, forward portion of bore 617 is larger than that of the outside diameter of recirculation orifice means 621, which is placed into said bore before threadably attaching head 605, with lock nut 622, to first reciprocating means 620. The interior of bore 617 (FIG. 3-5) is machined to provide a seat for said recirculation orifice 621, which orifice has a bore 623 therethrough which is coaxial with bore 617 when the components are assembled (FIGS. 4-5, 7). FIGS. 4 and 5 illustrate the additional machining of the bore 623 in orifice 621, which provides a subtantially frustoconically shaped entrance portion 624, and a substantially frustoconically shaped exit portion 625. Exit portion 625 is machined to be complementary to the frustoconical portion of second reciprocating means 650, whereby a sealing seat is formed by the contact of means 650 with recirculation orifice 621. Orifice 621 comprises a shoulder portion 629 of greater diameter than body portion 626, which shoulder portion is retained by receiving shoulder 630 in bore 617 of means 620, and which body portion fits coaxially with portion 631 of bore 617 (FIGS. 4-5). A continuous path for liquid communication is thereby provided from port 608 to bore 610 and bore 623 of recirculation orifice 621.

First reciprocating means 620 is coaxially disposed within the central axial bore 35 in valve body 600. A portion of that central axial bore 35, located in submember 601, has a diameter larger than that of the first exterior portion 632 of first reciprocal member 620. That forward portion of bore 35 comprises reactive component chamber 660. Reactive component chamber 660 communicates with reactive component supply means 11 through subpassage 661. Reactive component chamber 660 has no permanent fluid communication with injection orifice 604, bore 614 or port 500. It only communicates intermittently, through the forwardmost portion of central axial bore 35, with bore 614 through injection orifice 604 and, when tip 615 is not seatingly engaged with surface 619 of bore 614, with port 500. Rearward communication of reactive component chamber 660 with any additional portion of the central axial bore 35 is prevented by the presence of seal set 43, 44, which has an outermost O-ring seal 43 and an innermost step seal 44 seated in an annular groove in the body member 601. Most preferably, that groove is machined into the face of member 601 at its junction with member 602 (FIG. 3).

First reciprocating means 620 has a second exterior portion 633 having a diameter greater than portion 632, forming a shoulder 632a therebetween, but a diameter less than double acting piston portion 634 of said means (FIG. 7). Rearwardly with respect to injection orifice 604, central axial bore 35 in member 602 changes in diameter, opening out from a diameter providing sliding fit with first exterior portion 632 of means 620 to a diameter providing sliding fit with said second exterior portion 633 thereof (FIGS. 4-5, 7). The length of that first portion 632 of means 620 having the smaller diameter is such that it extends into the opened-out portion of the bore 35, to provide reactive component recirculation chamber 670 therebetween, which is connected by passage 671 to component internal recirculation return conduit means 13. Chamber 670 has no permanent fluid communication with either reactive component chamber 660 or supply means 11; it communicates only intermittently with said chamber 660 and supply means 11. Recirculation ports 672, radially disposed in means 620, effect fluid communication from the exterior surface 632 to the internal bore 617 of means 620. Recirculation ports 672, when means 620 is assembled in central axial bore 35, provided means for fluid communication between bore 617 and recirculation chamber 670.

Seal set 44a, 45 is provided on the outer surface of portion 633 of first reciprocating means 620, the set consisting of inner O ring 44a and outer Glydring ® seal 45.

Second reciprocating member 650 is disposed in the interior bore 617 of first reciprocating member 620 in the preferred embodiment of the invention. In the preferred embodiment, the internal recirculation path of the valve comprises a portion of internal bore 617 of means 620. In alternative embodiments, however, an alternate internal recirculation path may be provided which does not comprise an internal bore 617 through a first reciprocating member 620. Instead, a separate internal recirculation path may be provided within which a second reciprocating member 650 is placed downstream of a recirculation orifice 621, which member 650 effects a sealing seat with a frustoconical surface 625 in bore 623, in the same manner as is illustrated in FIGS. 4–5.

Two sets of peripheral seals 46, 47 and 48, 49 surround the body of means 650, consisting of inner O-ring seals 46 and 48, outer Glydring ® seal 47, and outer step seal 49, providing sliding sealing engagement with the complementary surface of bore 617 (FIGS. 3,7).

The length of the body of second reciprocating means 650 is such that it does not exceed the distance between radially arrayed recirculation ports 672 and hydraulic ports 675, which ports 675 communicate with bore 617 of means 620 rearwardly of means 650, while ports 672 communicate with bore 617 forwardly of means 650 (with respect to injection orifice 604). Bottlenosed spacer extension means 680 are disposed in bore 617 rearwardly of second reciprocating means 650, and provided with seal sets 50, 51 and 52, 53, consisting of inner O-ring seals 50, 52 and outer step seals 51, 53. Seal sets 50, 51 and 52, 53 provide sliding sealing engagement for means 680 with the complementary surface of bore 617 (FIGS. 3, 7).

First reciprocating means 620 includes double acting piston portion 634, which comprises a flange of a diameter greater than that of second portion 633. Seal set 54, 55, consisting of inner O-ring 54 and outer Glydring ® seal 55, provides sliding sealing engagement with the complementary surface of portion 700 of central axial bore 35. Piston portion 634 has a face 635, disposed forwardly towards injection orifice 604, and a face 636, disposed rearwardly away from said orifice 604. Hydraulic conduit 14 communicates with the chamber formed by portion 700 of bore 35, portion 634 of means 620 and end cap means 692, which is secured to body member 602 by through bolts 101 (FIG. 3), and hydraulic conduit 15 communicates through passage 15a with the chamber formed by portion 700 of bore 35, and portion 634 of means 620. End cap means 692 has forwardly projecting annular means 693, the outer surface of which slidingly engages the complementary surface of portion 700 of bore 35, the inner surface of which engages the outer surface 633a of first reciprocating means 620 (FIGS. 3, 7). Sealing fit to portion 700 is provided by O-ring 56; seal set 57, 58, consisting of inner O-ring 57 and outer step seal 58, provides sliding sealing engagement with the outer surface 633a of means 620.

End cap means 692 further comprises rearwardly projecting annular means 694, which are internally threaded to receive adjustable externally threaded adjustable stop means 695. Adjustable stop means 695 present an inner surface 695a, which contacts end surface 637 of first reciprocating means 620, thereby limiting the rearwardmost travel of means 620 away from injection orifice 604. Second adjustable stop means 690 is externally threaded for receiving engagement with threaded bore 690a through first adjustable stop means 695. Lock nut 691, when backed off, allows adjustment of said second means 690 independently of the adjustment of first means 695, which is maintained in position by means of set screw 697 and the split thread means 695b which set screw 697 spreads. The end of means 690 distal from nut 691 contacts spacer extension 680, which in turns contacts second reciprocal means 650, thereby limiting the rearwardmost travel of means 650 away from recirculation orifice means 621, independently of the limitation of the rearwardmost travel of means 620 away from injection orifice 604.

While cylindrical threaded means 690 and 694 requiring manual adjustment are comprised in the preferred embodiment, other adjustable stop means and combinations of adjustable stop means known to the art may also be utilized, including adjustable piston stop means of the type disclosed in Boden, U.S. Pat. No. 4,378,335; Schmitz et al. U.S. Pat. No. 4,464,056 and Schmitz et al. U.S. Pat. No. 4,497,579, as well as the use of stepper motor driven adjustable stop means, including the application of independent stepper motors to each of means 690 and 694. Combinations of cylindrical threaded adjustable stop means, adjustable piston stop means and/or stepper motor adjustable stop means may be used, such combinations including adjustable piston stop means for the first reciprocating means 620 of the invention and cylindrical threaded adjustable stop means for the second reciprocating means 650, and adjustable piston stop means for both the first and second reciprocating means 620, 650.

The overall assembly of the first and second reciprocating means 620, 650 of the preferred embodiment of the invention is illustrated in FIG. 7, which shows the various subcomponents in an exploded perspective view. To assemble, second reciprocating means 650 is inserted into the rearward opening of bore 617 of first reciprocating means 620, and then the spacer extension 680 is inserted to follow means 650, insertion again being from the rearward opening of bore 617. Into the forward opening of bore 617 is placed recirculation orifice 621, which is advanced into the bore until shoulder 629 seats against receiving shoulder 630 in said bore 617 of means 620. Injection head 605 is then screwed into the threaded portion of bore 617 and lock nut 622 threaded onto the available threads of threaded portion 607, to secure the head in means 620. Injection orifice 604 is secured on bayonet pins 603 before submember 601 is bolted to mixing head body 999. All necessary seals are premounted to their various components.

Final assembly of the valve comprises the insertion of the assembled first and second reciprocating means assembly into portion 700 of central axial bore 35, after submember 602 is mounted to contact with submember 601. End cap member 692, in which adjustable stop means 690 and 695 have previously been inserted, is then mounted into portion 700 of central axial bore 35, with annular portion 693 surrounding, in sliding engagement, portion 633a of first reciprocating means 620. Bolts 101 are the mounted to secure the entire valve assembly to submember 601 and mixhead body 999.

The operation of the novel reaction component injection valve of the preferred embodiment is illustrated by reference to FIGS. 3–7, with respect to a cycle involving injection of reactive component, cessation of injection, internal recirculation, and the cessation and resumption of injection of reactive component.

FIG. 3 illustrates the reaction component injection valve in the internal recirculation state. Injection head 605's tip 615 is in sealing contact with interior surface 619 of injection orifice 604, preventing any injection of reactive component into the mixing chamber. Hydraulic pressure, supplied through conduit 14, acts against the rearward face 636 of double acting piston portion 634 of first reciprocating means 620, forcing means 620 towards the injection orifice 604 and thereby maintaining the sealing contact.

Reactive component enters chamber 660 through conduit means 11 and, being unable to exit through injection orifice 604 and port 500, instead flows through ports 608 in injection head 605 into internal bore 610, and then into bore 623 in recirculation orifice 621. The pressure of the reactive component passing into bore 623 drives second reciprocating means 650 back in bore 617 until it contacts spacer extension 680, which in turn contacts second adjustable means 690, stopping the rearward travel of means 650. That opens an annular passage between the forward frustoconical portion of means 650, and the rearwardly-disposed frustoconical portion 625 of bore 623 through recirculation orifice 621. The annular passage constitutes a throttling passage, whose dimension and thus throttling effect on recirculating reactive component is established by the position of adjustable stop means 690. The further means 690 is set into the valve, the narrower the annular space between means 650 and recirculation orifice 621, the greater the throttling constriction and the higher the recirculation back pressure.

Reactive component, after flowing through orifice 621, exits bore 617 through recirculation ports 672, recirculation chamber 670, passage 671 and internal recirculation return conduit means 13. The larger effective area of rearward face 636 of portion 634 of means 620 allows the use of hydraulic fluid under pressure only slightly greater than that which the reactive component is under, as that component acts only on the end face of bore 617 and lock nut 622, which have a much smaller effect area than face 636.

To initiate pour, hydraulic pressure is removed from conduit 14 and applied to conduit 15 and passage 15a. Hydraulic fluid pressure is thereby applied to forward face 635 of portion 634 of means 620 at the same time said fluid is passing through ports 675 into that portion of bore 617 behind second reciprocating means 650. Because of the bottle nose of spacer extension 680, hydraulic pressure is brought to bear on the rearward face of means 650, forcing it towards the recirculation orifice 621. The force applied to the much larger area 635 of portion 634 of means 620 simultaneously acts to retract means 620 rearwardly, withdrawing tip 615 of injection head 605 from its seating seal with injection orifice 604. That opening immediately constitutes the path of least resistance to inflowing reactive component, which begins to flow through injection orifice 604 and port 500 into the mixing chamber. In turn, that rapidly decreases the remaining flow of recirculating reactive component through orifice 621, allowing the hydraulic pressure behind means 650 (from liquid flowing through ports 675) to force the frustoconical portion thereof against the complementary seat 625 in means 621, stopping recirculation flow. Rearward motion of means 620 continues until end 637 contacts face 695a of first adjustment means 695, which stops rearward travel. Reactive component thereafter travels from conduit means 11, into chamber 660, between the fins 613, and in slots 616, and inner surface 614 of injection orifice 604, into the generally frustoconical space between tip 615 and portion 619 of surface 614, and out of injection orifice 604 and port 500 into the mixing chamber.

The distance between tip 615 and portion 619 is established by first adjustable means 695. This again constitutes an annular, throttling passage. The further means 695 is set forwardly into the valve body, the narrower the annular space, the higher the pour pressure. Variation of the adjustable stop means 695 varies the pour pressure.

To complete the cycle, hydraulic pressure is removed from conduit 15 and re-applied to conduit 14. Pressure will be applied against rearward face 636 of portion 634 of means 620, driving the assembly forward, so as to bring tip 615 of injection head 605 into sealing contact with inner surface 619 of injection orifice 604. That in turn stops injection of reactive component into and through port 500 to the mixing chamber. The forward movement of first reciprocating means 620 drives hydraulic fluid before forward face 635 of portion 634, pushing fluid out through passage 15a and conduit 15, which starts fluid draining through ports 675. As the reactive component ceases flow through injection orifice 604, it again flows through ports 608, into bore 610, through bore 623 in recirculation orifice 621, and again forces second reciprocating means 650 back to open access to ports 672, passage 671 and conduit 13.

The two reciprocating means therefor constantly follow a sequence of repeated rearward to forward, then forward to rearward movement, each hence shuttling between each of two positions; while one means is forward, the other is rearward, then vice versa. The first reciprocating means 620 of the reactive component injection valve of the invention thus constitutes a pour shuttle, and the second reciprocating means 650 of said valve constitutes a recirculation shuttle. Both act with orifice means (604 and 621, respectively) to provide an annular throttling flow path for the reactive component when in the injection and internal recirculation modes.

The proximity of these throttling points to each other makes close and maintainable pressure balance readily attainable between pour and recirculation modes. This in turn affords virtually instantaneous transition from internal recirculation to injection and vice versa, valve characteristics essential to providing dual density mix through high pressure impingement mixing.

The reaction component valve of the invention is hydraulically actuated to commence injection, with simultaneous hydraulic actuation to close off the internal recirculation path. While the cessation of injection by closing off injection orifice 604 is also hydraulically actuated, however, the opening of the internal recirculation path is actuated by the flow of reactive component alone, without any hydraulic intervention. Only when the internal recirculation path is selected does liquid reactive component flow into bore 617 in first reciprocating means 620; when the valve is in the injection mode, no reactive component is flowing through bore 617, or any other portion of said first or second reciprocating means 620, 650.

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

We claim:

1. A high pressure mixing head for mixing reactive components for reaction injection molding or reinforced reaction injection molding processes, comprising:

A. A mixing head body, having 1. means defining a first bore, said first bore defining an elongated mixing chamber having first and second opposite ends and a longitudinal axis, said mixing chamber being closed at one end and having an outlet opening at the other end;
2. at least one inlet port to said bore, for introducing a reactive component into said mixing chamber by injection therethrough;
3. at least one outlet passage from said first bore, axially aligned with and axially spaced from said inlet port;
4. means defining a second bore, said second bore defining an elongated quieting chamber having a longitudinal axis, said quieting chamber communicating with, and extending approximately normal to, said mixing chamber at said outlet opening, said quieting chamber having a discharge end remote from said outlet opening;

B. A first, metering plunger closely and slidably received in said first bore, mounted for reciprocal axial movement along the longitudinal axis of the mixing chamber between a retracted, injection position, wherein a mixture of said reactive components is formed in said mixing chamber, and an extended, recirculation position, wherein said plunger is advanced adjacent to said outlet opening to drive said mixture from said mixing chamber, said first, metering plunger having at least one axially extending by-pass channel, which provides fluid communication between said inlet port and said outlet passage when said first, metering plunger is in the recirculation position;

C. A second, clean-out plunger closely and slidably received in said quieting chamber, mounted for reciprocal axial movement along the longitudinal axis of the quieting chamber between a retracted position, wherein said mixture of said reactive components flow into said quieting chamber from said outlet opening in said mixing chamber, and an extended, clean out position wherein said second plunger is advanced adjacent to said discharge end to drive said mixture from said quieting chamber;

D. First motive means for reciprocably and selectably moving said first, metering plunger between its recirculation and injection positions;

E. Second motive means for reciprocably and selectably moving said second, clean-out plunger between its retracted and clean-out positions;

F. At least one reaction component injection valve means for injecting a reactive component through said inlet port into said mixing chamber, said injection valve means comprising:
1. A valve body;
2. injection nozzle means disposed in said body;
3. reactive component supply passage means disposed in said valve body, having intermittent fluid communication with said nozzle means;
4. first reciprocating means, disposed within said reactive component supply passage means in said valve body, selectably positionable to open, partially open or close said nozzle means, thereby varying the flow of reactive component through said supply passage means into and through said nozzle means, whereby the pour pressure of said component may be set;
5. reactive component recirculation passage means disposed in said valve body, having intermittent fluid communication with said supply passage means;
6. second reciprocating means, disposed within said recirculation passage means in said valve body, selectably positionable to open, partially open or close said recirculation passage means, thereby varying the flow of reactive component through said recirculation passage, whereby the recirculation pressure of said component may be set and recirculation effected internally to said valve.

2. The high pressure mixing head of claim 1 wherein said injection nozzle means and said first reciprocating means of said injection valve means are coaxially disposed.

3. The high pressure mixing head of claim 1 wherein said injection nozzle means, said first reciprocating means and said second reciprocating means of said injection valve means are coaxially disposed.

4. The high pressure mixing head of claim 1, wherein said injection valve means further comprise first adjustable stop means disposed in the path of said first reciprocating means, whereby at least one open position of said first reciprocating means with respect to said nozzle means may be established by contact of said reciprocating means with said first adjustable stop means.

5. The high pressure mixing head of claims 1 or 4, wherein said injection valve means further comprise second adjustable stop means disposed in the path of said second reciprocating means, whereby at least one open position of said second reciprocating means with respect to said recirculation passage means may be established by contact of said second reciprocating means with said second adjustable stop means.

6. The high pressure mixing head of claims 1, 2, 3 or 4 wherein said injection valve means further comprise:
recirculation orifice means within said recirculation passage means, disposed upstream of said second reciprocating means, which orifice and second reciprocating means in combination form throttling means for reactive component recirculating through said recirculation passage means, the separation between said orifice means and said second reciprocating means setting the degree of throttling.

7. The high pressure mixing head of claim 1, wherein said injection valve means further comprise:
a. adjustable stop means disposed in the path of said second reciprocating means, whereby at least one open position of said second reciprocating means with respect to said recirculation passage may be established by contact of said reciprocating means therewith; and
b. recirculation orifice means within said recirculation passage means, disposed upstream of said second reciprocating means, which orifice and second reciprocating means in combination form throttling means for reactive component recirculating through said passage, the separation between said orifice and said second reciprocating means setting the degree of throttling.

8. The high pressure mixing head of claim 1, wherein said first reciprocating means of said injection valve means is positioned hydraulically with respect to said injection nozzle means.

9. The high pressure mixing head of claim 1 wherein said second reciprocating means of said injection valve means is positioned by the flow of recirculating reactive component when recirculation is effected subsequent to injection, and positioned hydraulically to cease recirculation and resume injection.

10. The high pressure mixing head of claim 1, wherein said first and second reciprocating means of said injection valve means are shuttle valves.

11. The high pressure mixing head of claim 10 wherein said first and second reciprocating means are coaxially disposed.

12. The high pressure mixing head of claim 1, wherein said first reciprocating means of said injection valve means includes a longitudinal bore therethrough, in which bore said second reciprocating means is disposed.

13. The high pressure mixing head of claims 10, 11 or 12 wherein said first and second reciprocating means of said injection valve means have substantially frustoconical surfaces disposed towards said nozzle means.

14. The high pressure mixing head of claim 4 wherein said first adjustable stop means in said injection valve means comprise a cylindrical member threadably engaged with receiving means in said valve body.

15. The high pressure mixing head of claim 14 wherein said first adjustable stop means in said injection valve means comprise piston means displaceable in said valve body and defining therewith a chamber adapted to receive a hydraulic medium, and wherein an end of said piston forms said stop for said first reciprocating means.

16. The high pressure mixing head of claim 14 wherein said injection valve means further comprise second adjustable stop means disposed in the path of said second reciprocating means, whereby at least one open position of said second reciprocating means with respect to said recirculation passage means may be established by contact of said second reciprocating means therewith, said second adjustable stop means comprising a cylindrical member threadably engaged with receiving means in said first adjustable stop means for said first reciprocating means, and being independently adjustable from said first adjustable stop means for said first reciprocating means.

17. The high pressure mixing head of claim 15 wherein said injection valve means further comprise second adjustable stop means disposed in the path of said second reciprocating means, whereby at least one open position of said second reciprocating means with respect to said recirculation passage means may be established by contact of said second reciprocating means with said second adjustable stop means, said second adjustable stop means comprising a cylindrical member threadably engaged with receiving means in said valve body.

18. The high pressure mixing head of claim 15 wherein said injection valve means further comprise second adjustable stop means disposed in the path of said second reciprocating means whereby at least one open position of said second reciprocating means with respect to said recirculation passage means may be established by contact of said reciprocating means with said second adjustable stop means, said second adjustable stop means comprising piston means displaceable in said valve body and defining therewith a chamber adapted to receive a hydraulic medium, and wherein an end of said piston forms said second adjustable stop means for said second reciprocating means.

19. A high pressure metering head for mixing reactive components comprising: a metering chamber communicating with a quieting chamber, a reactive component injection valve communicating with said metering chamber, a first plunger in said metering chamber movable between a retracted position in which reactive component is injectable into said metering chamber through said injection valve and an extended position in which material in said metering chamber is discharged into said quieting chamber, first recirculation passage means in said metering chamber and first plunger for recirculating reactive component injected into said metering chamber through said injection valve when said first plunger is in said extended position, first reciprocating means selectively movable between open and closed positions for selectively starting and stopping discharge of reactive component from said injection valve, and second recirculation passage means within said injection valve for recirculating reactive component when said first reciprocating means is in said closed position blocking discharge of reactive component from said injection valve into said metering chamber, whereby selective operation of said first reciprocating means provides selective use of only one or the other of said first and second recirculation passage means.

20. The mixing head of claim 19 wherein said first reciprocating means is selectively movable to throttling positions intermediate said open and closed positions for selectively varying the discharge rate of reactive component from said injection valve to said metering chamber.

21. The mixing head of claim 19 including second reciprocating means for selectively opening, closing and throttling flow of reactive component through said second recirculation passage means whereby the flow rate of reactive component through said second recirculation passage means is selectively adjustable.

22. The mixing head of claim 19 wherein said injection valve includes a nozzle having a nozzle outlet communicating with said metering chamber and said second recirculation passage means includes an orifice axially spaced from and axially aligned with said nozzle outlet, and flow of reactive component being in one axial direction through said nozzle outlet and being in an opposite axial direction through said orifice.

23. An injection valve including a nozzle having a nozzle outlet, first reciprocating means for selectively opening and closing said nozzle outlet, recirculation passage means in said valve for recirculating material therethrough when said nozzle outlet is closed, said recirculation passage means including an orifice axially spaced from and axially aligned with said nozzle outlet, a material supply chamber between said orifice and said nozzle outlet, and flow of material through said nozzle outlet from said supply chamber being in one axial direction when said nozzle outlet is open and said orifice is closed, and being in an opposite axial direction from said supply chamber through said orifice when said nozzle outlet is closed and said orifice is open.

24. The valve as defined in claim 23 including second reciprocating means selectively movable between open and closed positions for selectively opening and closing said orifice.

25. The valve as defined by claim 24 wherein said second reciprocating means is carried by said first reciprocating means and selectively reciprocates relative thereto.

26. A reaction component injection valve for high pressure mixing of reactive components for reaction injection molding or reinforced reaction injection molding processes, comprising:
  a. a valve body;
  b. injection nozzle means disposed in said body;
  c. reactive component supply passage means disposed in said body, having intermittent fluid communication with said nozzle means;
  d. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;
  e. reactive component recirculation passage means disposed in said body, having intermittent fluid communication with said supply passage means;
  f. second reciprocating means, disposed within said recirculation passage means in said body, selectably positionable to open, partially open or close said recirculation passage means, thereby varying the flow of reactive component through said recirculation passage, whereby the recirculation pressure of said component may be set and recirculation effected internally to said valve;
  g. said injection nozzle means, said first reciprocating means and said second reciprocating means being coaxially disposed.

27. The reactive component injection valve of claim 26 said valve further comprising recirculation orifice means within said recirculation passage means, disposed upstream of said second reciprocating means, which orifice and second reciprocating means in combination form throttling means for reactive component recirculating through said recirculation passage means, the separation between said recirculation orifice means and said second reciprocating means setting the degree of throttling.

28. A reaction component injection valve for high pressure mixing of reactive components for reaction injection molding or reinforced reaction injection molding processes, comprising:
  a. a valve body;
  b. injection nozzle means disposed in said body;
  c. reactive component supply passage means disposed in said body, having intermittent fluid communication with said nozzle means;
  d. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;
  e. reactive component recirculation passage means disposed in said body, having intermittent fluid communication with said supply passage means;
  f. second reciprocating means, disposed within said recirculation passage means in said body, selectably positionable to open, partially open or close said recirculation passage means, thereby varying the flow of reactive component through said recirculation passage, whereby the recirculation pressure of said component may be set and recirculation effected internally to said valve;
  g. said first and second reciprocating means being shuttle valves; and
  h. said first and second reciprocating means being coaxially disposed.

29. The reactive component injection valve of claim 28 wherein said first and second reciprocating means have substantially frustoconical surfaces disposed towards said nozzle means.

30. A reactive component injection valve for high pressure mixing of reactive components for reaction injection molding or reinforced reaction injection molding processes, comprising:
  a. a valve body;
  b. injection nozzle means disposed in said body;
  c. reactive component supply passage means disposed in said body, having intermittent fluid communication with said nozzle means;
  d. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;
  e. reactive component recirculation passage means disposed in said body, having intermittent fluid communication with said supply passage means;
  f. second reciprocating means, disposed within said recirculation passage means in said body, selectably positionable to open, partially open or close said recirculation means, thereby varying the flow of reactive component through said recirculation passage, whereby the recirculation pressure of said component may be set and recirculation effected internally to said valve; and
  g. said first reciprocating means including a longitudinal bore therethrough, in which bore said second reciprocating means is disposed.

31. The reactive component injection valve of claim 30 wherein said first and second reciprocating means have substantially frustoconical surfaces disposed towards said nozzle means.

32. A reaction component injection valve for high pressure mixing of reactive components for reaction injection molding or reinforced reaction injection molding processes, comprising:
  a. a valve body;
  b. injection nozzle means disposed in said body;
  c. reactive component supply passage means disposed in said body, having intermittent fluid communication with said nozzle means;
  d. first reciprocating means, disposed within said reactive component supply passage means in said body, selectably positionable to open, partially open or close said nozzle means, thereby varying the flow of reactive component through said supply passage means into and through said nozzle means, whereby the pour pressure of said component may be set;
  e. reactive component recirculation passage means disposed in said body, having intermittent fluid communication with said supply passage means;
  f. second reciprocating means, disposed within said recirculation passage means in said body, selectably positionable to open, partially open or close said recirculation passage means, thereby varying the flow of reactive component through said recirculation passage, whereby the recirculation pressure of said component may be set and recirculation effected internally to said valve;

g. said first and second reciprocating means being shuttle valves; and h. said first and second reciprocating means having substantially frustoconical surfaces disposed towards said nozzle means.

33. An injection valve including a nozzle having a nozzle outlet, first reciprocating means for selectively opening and closing said nozzle outlet, recirculation passage means in said valve for recirculating material therethrough when said nozzle outlet is closed, said recirculation passage means including an orifice, second reciprocating means for selectively opening and closing said orifice and said recirculation passage means, and said nozzle outlet, said orifice, said first reciprocating means and said second reciprocating means being coaxially disposed.

34. The valve as defined in claim 33 including means for selectively independently adjusting the open positions of said first and second reciprocating means for respectively independently varying the discharge rate through said nozzle outlet and the flow rate through said recirculation passage means.

35. An injection valve including a nozzle having a nozzle outlet, a first shuttle valve for selectively opening and closing said nozzle outlet, recirculation passage means in said valve for recirculating material therethrough when said nozzle outlet is closed, a second shuttle valve for selectively opening and closing said recirculation passage means and said first and second shuttle valves having substantially frustoconical surfaces disposed towards said nozzle outlet.

36. The valve as defined in claim 35 including means for selectively independently adjusting the open positions of said first and second shuttle valves for respectively independently varying the discharge rate through said nozzle outlet and the flow rate through said recirculation passage means.

* * * * *